UNITED STATES PATENT OFFICE.

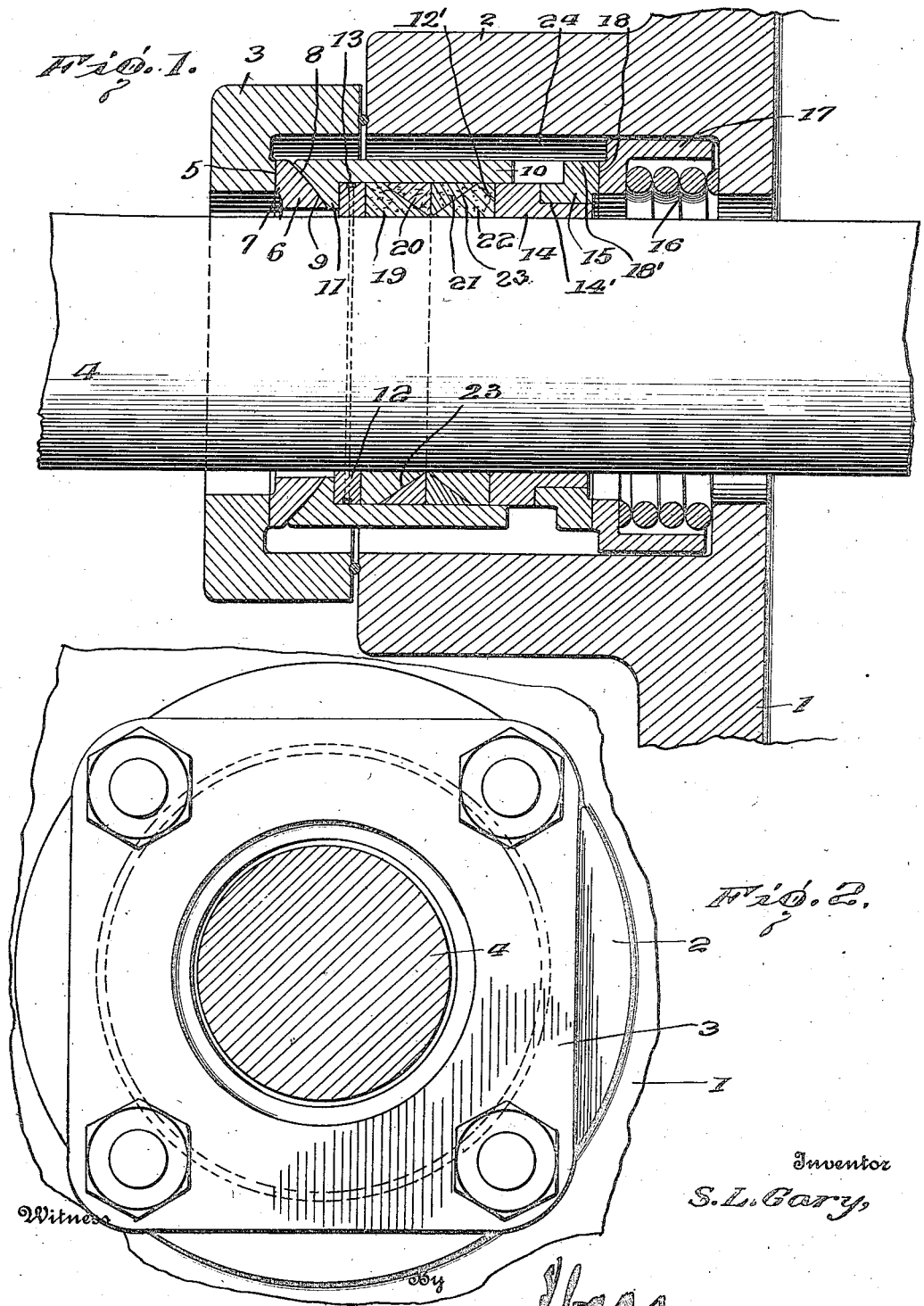

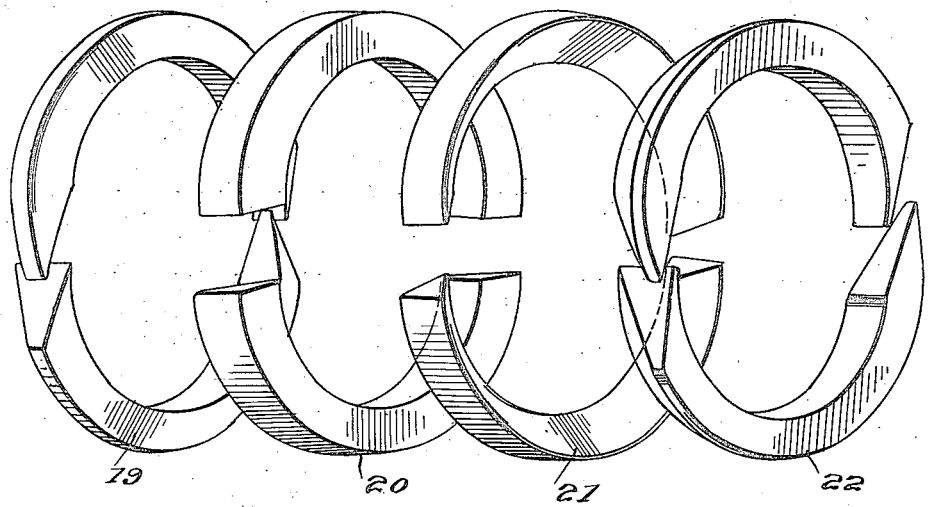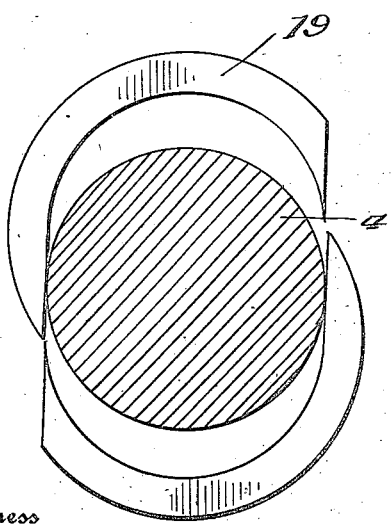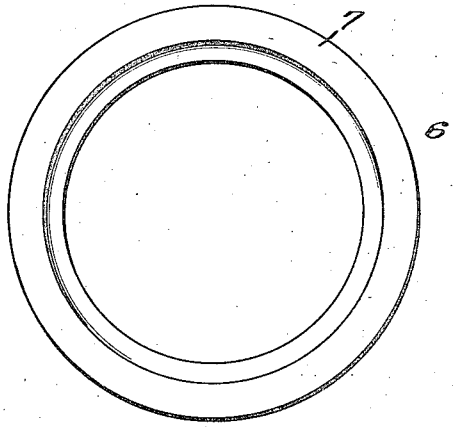

SHIRLEY L. GARY, OF SOUTH RICHMOND, VIRGINIA.

ROD-PACKING.

1,223,688.

Specification of Letters Patent. Patented Apr. 24, 1917.

Application filed August 10, 1915. Serial No. 44,797.

*To all whom it may concern:*

Be it known that I, SHIRLEY LACEY GARY, a citizen of the United States, residing at South Richmond, in the county of Chesterfield and State of Virginia, have invented certain new and useful Improvements in Rod-Packing, of which the following is a specification.

This invention provides a packing designed most especially for the piston rods of fluid motors, such as locomotives and other types of horizontal engines, but it is to be understood that the packing may be adapted for uses requiring the maintenance of steam and fluid tight joints of valve stems and rods of motors, pumps and like devices under varying conditions encountered in the operation thereof.

The invention provides a rod packing which maintains a tight joint even though the rod for any reason does not travel in a path absolutely true as is the case when either the cross head or the piston becomes loose.

The invention further provides a rod packing that requires but very little lubrication and which gives satisfactory results when lubricated by the same means employed for lubricating the piston and cylinder.

The invention also provides a rod packing which enables a nonsplit cup to be employed in connection with shouldered rods or rods having enlarged ends and which admits of the rods being trued or turned down when worn without necessitating extensive replacements of the packing elements.

The invention also provides a rod packing which admits of white metal packing elements being advantageously utilized without liability to overheat or become rapidly worn by friction or wear.

The invention further aims to provide a rod packing which embodies a minimum number of parts, is proof or nearly so against leak, is automatic in adapting itself for wear and any departure of the rod from a true path and which, moreover, is durable, long lived and free from requiring frequent repairs.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings,—

Figure 1 is a sectional view of a cylinder head, stuffing box, gland and packing embodying the invention;

Fig. 2 is an end view.

Fig. 3 is a detail view in perspective of that part of the packing embodying four complementary rings.

Fig. 4 is a detail view showing the manner of fitting a ring about the rod;

Fig. 5 is a detail view of the ring which engages the gland.

Corresponding and like parts are referred to in the following description and indicated in all the views of the drawings by the same reference characters.

The accompanying drawings illustrate the invention in connection with a piston rod and stuffing box of a cylinder head in which the numeral 1 designates the head of the cylinder, 2 the stuffing box, 3 the gland and 4 the piston rod. The openings in the gland and cylinder head through which the piston rod 4 passes are of larger diameter than the piston rod to admit of the latter vibrating or assuming a position from a true line without binding upon either the gland or the cylinder head. The gland 3 is adapted to be bolted or otherwise secured to the cylinder head and is provided upon its inner wall with a raised portion 5 constituting a seat which surrounds and is concentric with the opening through which the piston rod 4 passes. The face of the raised seat 5 is ground to insure a fluid tight joint between it and a head ring 6. The rod 4 passes loosely through the ring 6 and is adapted to have a limited lateral play therein. The outer face of the head ring 6 is formed with a raised portion 7 which bears against the face of the raised portion 5 to form a fluid tight joint therewith. The inner face 8 of the ring 6 is convex and matches a concave seat 9 formed at the outer end of a cup 10 which receives the packing rings fitted closely upon the piston rod 4. The joint formed between the head ring 6 and cup 10 inclines inwardly and downwardly from the outer corner formed between the rim and end of the parts comprising the gland 3. The tendency of any fluid finding its way into the stuffing box and gland is to escape by way of the joint between the parts 6 and 10 and if such joint extended outwardly and downwardly or in an opposite direction to that shown the escape of such fluid would be more direct than by way of the joint illustrated which causes such fluid to return upon itself, thereby reducing the chances for leak to the smallest amount possible.

The cup 10 receives the packing rings proper and is provided at its outer end with an inner flange 11. The concave face 9 at the outer end of the cup 10 extends across the outer face of the flange 11, thereby providing a greater extent of contacting surfaces at the joint to preclude any leak. This concavo convex joint accommodates a relative departure of the piston rod from a true line of travel without any tendency toward an escape of any fluid finding its way into the space exterior to the cup 10 and within the stuffing box and gland. The inner face of the flange 11 is straight. An abutting ring 12 having straight side faces is placed within the cup against the flange 11 and is preferably formed of bronze and is made in sections which are held together by means of a retainer 13, the same consisting of a spring wire of circular form sprung into an annular groove formed in the outer edge of the ring 12. A second abutting ring 14 having its forward end provided with a straight face 12' and its rear end reduced to form an annular seat 14' is located within the opposite end of the cup 10 and between the two rings 12 and 14 is disposed the packing proper which comprises a plurality of split packing rings. The rings 12 and 14 serve to confine the packing rings and to sustain the end thrust, hence may be designated as abutments. The ring 14 may be constructed of bronze, or like metal, and is formed of sections which are held in place by means of a retaining or follower ring 15 which latter is preferably constructed of steel and fitted in the annular seat 14' of the follower ring 14, as shown. While the rings 14 and 15 are preferably formed of separate parts it is to be understood that they may be of integral construction.

An expansible helical spring 16 is disposed within the inner end of the stuffing box and normally exerts an outward pressure upon the follower ring 15 which is transmitted to the packing rings within the cup and through the latter to the inner flange 11 and the ring 6. The pressure exerted by the spring 16 maintains the joint between the cup 10 and ring 6 and the joint formed between the ring 6 and the seat 5 of the gland 3. The spring 16 is housed by means of a case or barrel 17, the end of such barrel being formed with a raised portion 18 forming a seat which forms a fluid tight bearing joint with a thickened portion or shoulder 18' on the ring 15, as shown. The joint formed between the parts 15 and 18 may be ground or made true in any manner to prevent any loss of fluid pressure.

The packing proper comprises four rings 19, 20, 21 and 22. The rings 19 and 22 are of similar or like formation. The rings 20 and 21 are of duplicate construction. The outer faces of the rings 19 and 22 are straight to abut against the straight faces of the respective rings 12 and 14. The inner faces of the rings 19 and 22 are inclined. The rings 19 and 22 are preferably of white metal which contemplates a composition containing tin, antimony, copper, zinc, lead and the like in various proportions. By having the rings 19 and 22 constructed of white metal little or no lubricant is required because such metal provides an anti-friction bearing contact with the piston rod 4. The packing rings 19 and 22 are of sectional formation, such as indicated most clearly in Fig. 3, the sections being of similar formation and the joint-forming face of each arm of each section being in a plane longitudinal to the inner surface of the section, the joints between the meeting ends of the sections being parallel so that the sections may be readily placed together or removed from about the rod 4. The inner inclined faces of the packing rings 19 and 22 intersect the inner walls of such rings, thereby forming chisel shaped edges which permit the packing rings to readily adapt themselves so as to compensate for wear and at the same time provide a fluid tight joint between the packing rings and the cup 10 and piston rod 4. The packing rings 20 and 21 embody like sections which have their meeting ends radial. The abutting faces of the packing rings 20 and 21 are radial whereas their inner walls are inclined to match the inclined faces of the packing rings 19 and 22. The joints 23 formed between the meeting faces of the packing rings are inclined and the inclination may vary as desired according to the bevel of the meeting faces of coacting packing rings. The complemental packing rings coöperate by a wedging action with the result that the packing rings 20 and 21 are pressed outward and the packing rings 19 and 22 are pressed inward, thereby holding the outer walls of the packing rings 20 and 21 in close contact with the inner wall of the cup 10 and the inner walls of the packing rings 19 and 22 in close contact with the outer surface of the piston rod 4. As hereinbefore stated the helical spring 16 exerts a pressure which tends to crowd the packing rings together by means of an end-wise pressure thereon with the result that the coacting packing rings ride upon one another and are forced apart by a wedging action due to the inclined joints 23. When assembling the packing rings they are disposed to break joint, thereby preventing any escape of fluid. The packing rings 20 and 21 are preferably formed of brass or like metal because they are seldom, if ever, required to be replaced and the packing rings 19 and 22 are preferably formed of white metal because of the adaptability to maintain a close joint with the coacting parts and to avoid the necessity for special lubrication.

When the parts are assembled substantially as indicated in Fig. 1 a space 24 is provided between the inner walls of the stuffing box and gland and the outer walls of the parts 6, 10, 14 and 15. This space provides for ample movement of the packing should the piston rod 4 vibrate or tend to travel in a path which is not in absolute true alinement with the cylinder. The concavo convex joint formed between the ring 6 and cup 10 insures the maintenance of a fluid tight joint should the piston rod depart in its travel from an absolutely true line. The straight joints between the meeting faces of the gland 3 and ring 6 and between the ring 15 and case 17 maintain a fluid tight joint under all conditions, such parts being pressed together by means of the spring 16 and the action of the fluid pressure against the inner wall of the case or barrel 17. The inner walls of the packing rings 19 and 22 receive and sustain the wear incident to the travel of the piston rod and since the packing rings 19 and 22 are at all times subjected to end-wise pressure they are forced inward by a wedging action by reason of the inclined joints formed between them and the packing rings 20 and 21. It will thus be understood that the packing is such as to embody a minimum number of parts, require no special lubrication other than that provided for oiling the piston and cylinder, and preserve and maintain a fluid tight joint under varying conditions without necessitating frequent repairs or expensive replacements of parts. It will be noted that the inner face of the flange 11 is straight for engagement with the correspondingly straight side face of the abutting ring 12, while the latter in turn bears against the straight face of the packing ring 19, and the outer straight face 12' of the abutting ring 14 contacts with the straight face of the packing strip 22, thus causing the packing to be forced evenly over the rod so that friction and wear on the piston rod and packing are reduced to a minimum.

Having thus described the invention, what is claimed as new is:

1. A floating rod packing comprising a cup having an inwardly extending flange at its outer end, the inner face of which is straight, an abutting ring placed within the cup and having oppositely disposed straight faces one of which contacts with the straight face of the flange, a second abutting ring at the inner end of the cup having a straight face, two packing rings placed within the cup with their outer faces straight and in contact with the adjacent straight faces of the abutting rings and having their inner faces converging in the direction of the rod, two other packing rings mounted upon the converging faces of the first-mentioned packing rings and having their abutting faces straight, and means exerting a yieldable pressure against all of said rings.

2. A rod packing comprising a cup having an inwardly extending flange, the outer face of which is concave and the inner face of which is straight, an abutting ring placed within the cup and having a straight face bearing against the straight face of the flange, a second abutting ring having a straight face, a head ring having a convex face engaging the concave face of the flange, a plurality of metallic packing rings interposed between the abutting rings and provided with inclined edges intersecting at the surface of the rod, certain of said packing rings having straight faces for contact with the straight faces of the adjacent abutting rings, and means for exerting a yieldable pressure against all of the rings.

3. A rod packing of the floating type comprising a cup having an inwardly extending flange, the inner face of which is straight, an abutting ring having straight side faces, one of which bears against the straight face of the flange, a second abutting ring having its outer end straight and its inner end reduced to form a seat, a plurality of metallic packing rings seated within the cup and interposed between the abutting rings, said rings having inclined faces intersecting at the surface of the rod, a follower ring fitted to the seat in the second-mentioned abutting ring, and a spring bearing against the follower ring for exerting a yieldable pressure against all of the packing rings.

4. A rod packing comprising a cup having parallel inner and outer walls and provided at one end with an inwardly extending flange, the outer face of which is concave and the inner face of which is straight, a head ring having a convex face bearing against the concave face of the flange, an abutting ring having a straight face bearing against the straight face of the flange, a second abutting ring having a straight face, a plurality of packing rings interposed between the abutting rings, certain of said packing rings having straight faces for engagement with the straight faces of the adjacent abutting rings and inclined faces converging in the direction of the rod for contact with correspondingly inclined faces on the other of said packing rings, a follower ring, a barrel bearing against the follower ring, and a spring housed within the barrel for exerting a yieldable pressure on the follower ring.

5. A rod packing comprising a cup having its outer end provided with an inwardly extending flange, the outer face of which is concave and the inner face of which is straight, a head ring coacting with the flange, an abutting ring having straight side faces, one of which bears against the straight face of the flange, a second abutting ring having its front end straight and its rear end reduced to form a circumferential seat, a plurality of metallic packing rings interposed between the abutting rings, the outer faces of some of the packing rings being straight for engagement with the adjacent abutting rings and their inner faces converging in the direction of the rod for contact with correspondingly converging faces of the other of said packing rings, a follower ring fitted to the seat in the last-mentioned abutting ring and provided with a thickened portion having a flat face, a barrel having a flat face bearing against the flat face of the follower ring, and a spring arranged within the barrel for forcing the barrel and follower ring in the direction of the packing rings.

6. The combination with a piston rod, stuffing box and gland, of a cup disposed within the stuffing box and provided with an inwardly extending flange arranged within the gland and having its outer face concave and its inner face straight, a head ring having a straight face engaging the gland and a convex face engaging the convex face of the flange, an abutting ring having straight side faces, one of which engages the straight face of the flange, a second abutting ring having a straight face, two metallic packing rings placed within the cup with their outer faces straight and in contact with the straight faces of the adjacent abutting rings and having their inner faces converging in the direction of the rod, two other metallic packing rings mounted upon the converging faces of the first-mentioned packing rings and having their abutting faces straight, and means exerting a yieldable pressure against all of the packing rings.

7. The combination with a piston rod, stuffing box and gland, of a cup disposed within the stuffing box and provided with an inwardly directed flange, the outer face of which is concave and the inner face of which is straight, a head ring bearing against the gland and provided with a convex face engaging the concave seat of the flange, an abutting ring having opposite flat side faces, one of which engages the flat face of the flange, a second abutting ring having a flat face, a plurality of packing rings interposed between the abutting rings, some of said packing rings having outer flat faces for contact with the flat faces of the adjacent abutting rings and inner inclined faces converging in the direction of the rod for contact with correspondingly inclined faces on other of said packing rings, and means surrounding the piston rod for exerting a yieldable pressure on all of the packing rings, the cup and packing rings being normally spaced from the inner walls of the stuffing box and gland, respectively.

8. The combination with a piston rod, stuffing box and gland, the latter being provided with a flat bearing surface, of a cup disposed within the stuffing box and provided at its outer end with an inwardly extending flange, the outer face of which is concave and the inner face of which is straight, a head ring having a flat face engaging the flat bearing surface of the gland and provided with a convex face coacting with the concave face of the flange, an abutting ring having oppositely disposed flat side faces, one of which bears against the flat face of the flange, a second abutting ring having a flat face and provided with a circumferential seat, a plurality of metallic packing rings interposed between the abutting rings and provided with inclined faces intersecting at the surface of the rod, a follower ring engaging the seat, a barrel bearing against the follower ring, and a spring arranged within the barrel and encircling the piston rod for exerting a yieldable pressure on all of the packing rings, said cup, follower ring, abutting rings and packing rings being spaced from the walls of the stuffing box and gland, respectively.

9. The combination with a piston rod, stuffing box and gland, a head ring bearing against the gland, a cup disposed within the stuffing box and provided with an inwardly extending flange, the inner face of which is straight and the outer face of which is formed with a seat to receive the head ring, spaced abutting rings disposed within the cup, one of said abutting rings having a flat face for engagement with the flat face of the flange, a plurality of metallic packing rings interposed between the abutting rings and provided with knife edges intersecting at the surface of the rod, a follower ring engaging one of the abutting rings, and means for exerting a yieldable pressure on the follower ring, said cup, packing rings and follower ring, together with the piston, having a limited lateral movement within the stuffing box and gland, respectively.

In testimony whereof I affix my signature.

SHIRLEY L. GARY. [L. S.]